United States Patent [19]
Stirling

[11] 3,738,327
[45] June 12, 1973

[54] CATTLE FEEDER

[76] Inventor: Leroy D. Stirling, R.R. No. 1, Ridgetown, Ontario, Canada

[22] Filed: Feb. 11, 1972

[21] Appl. No.: 225,584

[30] Foreign Application Priority Data
Dec. 8, 1971 Canada ........................ 129662

[52] U.S. Cl. ................................................. 119/51 R
[51] Int. Cl. .................................................. A01k 05/00
[58] Field of Search ................ 119/51, 61, 54, 16, 119/58; 198/36; 119/51 R

[56] References Cited
UNITED STATES PATENTS
2,815,001  12/1957  Hanson ............................... 119/58
2,843,085  7/1958  McKee ................................. 119/16
3,620,192  11/1971  Taylor et al. ........................ 119/16

Primary Examiner—Hugh R. Chamblee
Attorney—Christopher Robinson, Eric L. Medcalf, Russell S. Smart et al.

[57] ABSTRACT

An animal feeder device, particularly suitable for use as an aid in the feeding of cattle, which incorporates a means for rearranging the feed when necessary in order to permit the animals to feed easily. The feeder comprises a frame assembly, a track disposed along the top of the frame and an auger assembly movable along the track. The auger of the auger assembly projects forwardly of the frame and is adapted to disengage feed from a feed pile situated in front of the frame, the disengaged feed falling within convenient feeding range of the animals.

8 Claims, 1 Drawing Figure

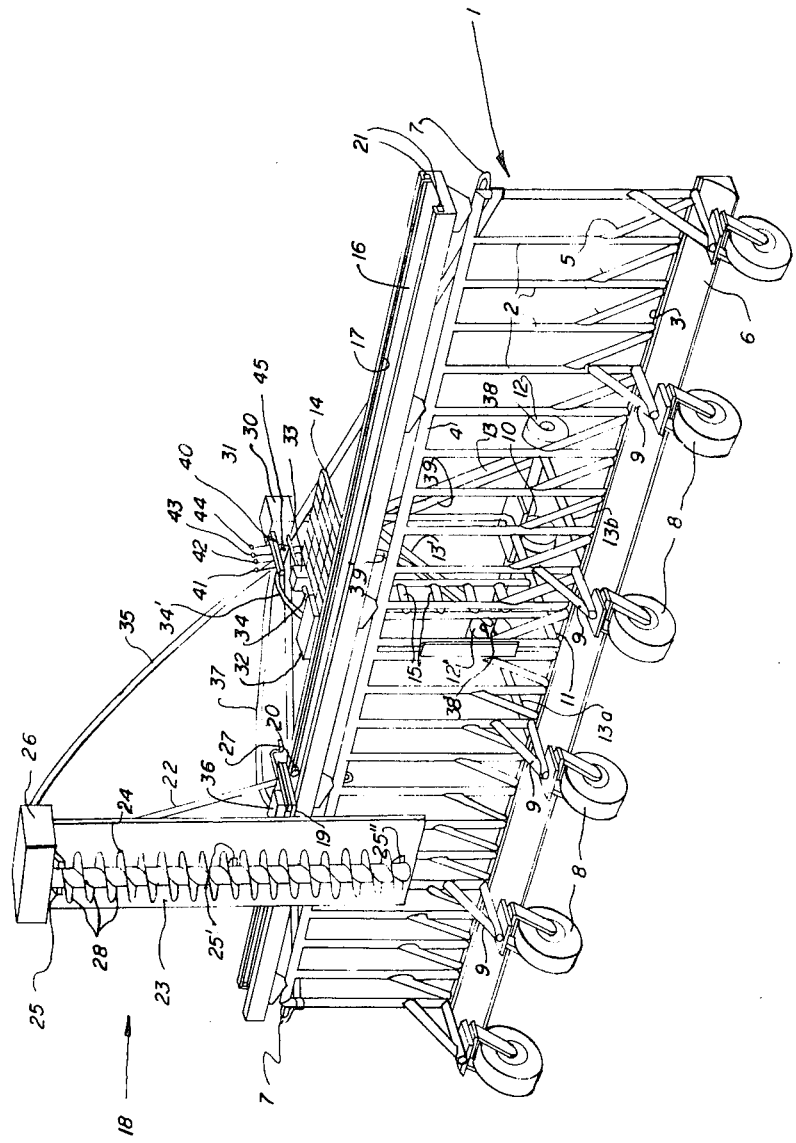

CATTLE FEEDER

BACKGROUND OF THE INVENTION

This invention relates to an animal feeder and in particular a feeder device adapted to aid the feeding of livestock or cattle.

In farming, it is desirable to prevent the animals, in particular livestock, from walking over and trampling their feed supply. If the animals are permitted to graze freely over their feed supply they have a tendency to crush and scatter the feed whereby causing a portion of the feed to be needlessly wasted.

Various arrangements are used to enable the animals to feed whilst at the same time preventing the animals from moving freely in the feed storage area. For example, it is known to use a feeder having a frame assembly with a plurality of vertical bars adapted to receive the head and neck of the animal between adjacent bars so as to permit it to reach the feed and at the same time preventing it from trampling the feed pile. Such arrangement cannot be used efficiently where the feed is arranged in a high vertical pile as in bunk or pit silos. Where the feed is arranged in such a pile, then the animals have easy excess only to the lower portion of the feed stock and tend to eat only that part of the stock which is easy to reach. It is then necessary to attempt to manually rearrange the hard-packed feed by moving some of the feed down to ground level so as to permit the cattle to have easy access to more feed. This is difficult due to the compact nature of the feed.

SUMMARY OF THE INVENTION

This invention relates to an animal feeder incorporating means adapted to rearrange the feed stock when necessary to permit the animals to feed easily. The animal feeder comprises, in combination, a. a frame assembly including a plurality of vertical bars spaced to receive the head and neck portion of a feeding animal between adjacent bars, b. horizontal track means disposed along the top of said frame assembly, and c. an auger assembly movable along said track means, said auger assembly having an auger projecting forwardly of said frame and adapted to remove feed from a feed pile situated in front of said frame, said auger being movable towards or away from said frame.

BRIEF DESCRIPTION OF THE DRAWING

The drawing shows an overall perspective view of a preferred embodiment of the animal feeder of this invention.

DETAILED DESCRIPTION WITH REFERENCE TO THE DRAWING

The animal feeder has a frame assembly designated generally as 1 with vertical bars 2 extending between a lower member 3 and an upper member 4. Vertical bars 2 may be welded or otherwise rigidly affixed to lower member 3 and upper member 4, and spaced to permit the head and neck of an animal to pass between adjacent bars. Angled struts 5 are also provided between each of the vertical bars 2, which enable smaller animals to feed through the bars whilst preventing them from crawling between the bars. The overall length of frame 1 will, of course, depend upon the number of animals to be fed. The base 6, which is attached to the lower member 3 of the frame 1, is curved towards the feed pile so as to move more easily when the animals push the frame up against the feed. Eyes 7 are fixed to upper member 4, so that, if required, chains, ropes or the like may be passed through the eyes in order to secure and maintain the feeder in a particular position against the feed pile.

Frame 1 is supported in an upright position by freely rotatable wheels 8, each of which is affixed to one of bars 2 by means of a cantilever brace 9, and a freely rotatable wheel 10 affixed to frame 1 by a cantilever brace 11. Wheels 8 and 10 are mounted on their respective cantilever brace supports so as to be free to rotate about vertical axes to allow the feeder to be maneuvered with ease. A pair of drive wheels 12 and 12' are attached to brace 11 by means of supports 13 and 13', and are also ataached to the lower member 3 of frame 1 by means of supports 13a and 13b. Supports 13 and 13' are pinned midway along their length and when they are unpinned the top half folds against cantilever brace 11, and the lower half drops against the drive axles of wheels 12 and 12' and is folded up against brace 11. Supports 13a and 13b are also pinned at the drive wheel they support, and are hinged at their attachment to lower member 3. When unpinned 13a and 13b swing towards the outside end of the feeder and are received in brackets. When the feeder has been positioned against the feed pile the wheels 12 and 12' and their supports are folded in the aforementioned manner, and thereby access of the animals to the feed pile is not unduly obstructed.

A platform 14 is mounted on brace 11, and steps 15 are provided on brace 11 in order to enable the operator to reach platform 14. The operator stands on the platform 14 when using the feeder.

The upper member 4 supports a track structure 16 which incorporates channels 17 and thereby forms a horizontal track for an auger assembly 18 mounted via base 19 on wheels 20 which are adapted to ride within the channels 17. The auger assembly 18 is prevented from running off the ends of track 16 by stop blocks 21. Auger assembly 18 is held in a vertical position by means of support braces 22 which are secured to base 19 and protective shield 23 respectively. The protective shield 23 serves to protect the operator from injury by the auger when operating the feeder. An auger 24 is mounted upon auger assembly 18 and is held in position by bearings at 25, 25' and 25''. A hydraulic motor 26, which drives the auger 24, is mounted on protective shield 23 at the top of the auger assembly 18.

The length of the auger selected will depend upon the height of the feed pile. Normally a length of about 6 feet is used, though up to 12 feet is envisaged. Auger 24 may optionally be provided with teeth 28 to assist in dislodging the feed. The auger assembly 18 may be moved towards or away from the frame 1 by means of a crank mechanism incorporated in base 19, the crank handle being shown at 27.

A gasoline powered motor unit 30, with an electric starter at 31, is rigidly secured to brace 11. Motor 30 is operatively connected with a pump 33 which in turn is operatively connected with oil reservoir 32 via hose 34. Oil reservoir 32 is in turn connected with a valve unit 40 by means of an input/output hose 34'. Via valve unit 40 the reservoir 32 is operatively connected with (a) hydraulic motor 26 by means of input/output hose 35; (b) hydraulic motor 36, mounted on base 19, by means of input/output hose 37; and (c) motors 38 and 38' located in the hubs of drive wheels 12 and 12' by means of input/output hoses 39 and 39'. The motor 36 powers wheels 20, and hub motors 38 and 38' power wheels 12 and 12' respectively. This hydraulic arrangement thus enables motor unit 30 to drive auger 24, wheels 20 and drive wheels 12 and 12'.

The hydraulic system is controlled by means of valve unit 40 which incorporates four 2-way control valves operated by switches 41, 42, 43 and 44. By operating these switches an operator standing on platform 14 may control the operation of the feeder.

For instance, when motor unit 30 has been started, the movement of switch 41 activates hydraulic motor 26 and thereby drives the auger 24. This is effected by the motor in motor unit 30 driving pump 33 which pumps oil from reservoir 32 through hose 34' to valve unit 40. From there the oil is directed by the control valves, as positioned by the movement of switch 41, through hose 35 to hydraulic motor 26 thereby activating said motor which in turn drives auger 24. The arrangement is such that by varying the movement of switch 41 the operator may control both the direction of rotation of the auger and its speed of rotation.

By similar mechanism the operator may, by movement of switch 42, cause motor 36 to be brought into action. This motor drives wheels 20 and thereby causes auger assembly 18 to be moved across track 16. The assembly 18 may be moved in both directions across track 16 depending upon the direction of movement of switch 42.

Switches 41 and 42 may be operated simultaneously so that the auger assembly 18 may be moved across the track 16 whilst the auger 24 is rotating.

A flow control valve 45 is also located in unit 40 and this valve controls the flow of oil such that the oil may pass either into hoses 35 and 37 (depending upon the operation of switches 41 and 42), or into hoses 39 and 39' (if switches 43 and 44 are operated). Thus, the operator may, by operation of valve 40, cut out switches 41 and 42 and bring into action switches 43 and 44. Only one pair of switches 41/42 and 43/44 respectively, may operate at one time.

When it is desired to move the whole feeder device then the operator sets valve 40 so as to bring into action switches 43 and 44 which control the movement of drive wheels 12 and 12'. These switches 43 and 44, when operated, cause the motor 30 to drive oil via hoses 39 and 39' to the hydraulic hub motors 38 and 38' in wheels 12 and 12'. Motors 38 and 38' hydraulically power the drive wheels and thereby may be made to move the whole feeder unit towards or away from the feed pile. By maneuvering the switches 43 and 44, the operator may vary the power supply to each of the hub motors in drive wheels 12 and 12' independently of one another and thereby has some means of steering the feeder device. When the device has been maneuvered up against the feed pile motors 38 and 38' will be cut out and the supports 13 and 13' may, if hingemounted, be folded up against brace 11 as aforementioned. In this way the wheel supports do not obstruct the access of the cattle to the feed pile. Similarly, as mentioned above, when the feeder device has been positioned against the feed pile, chains or ropes may be fed through the eyes 7 in order to stabilize the device in the correct position and to ensure that when the livestock push the device forwards they keep it in a line with the front of the feed pile.

It is an advantage in having the feeder device motor powered via the drive wheels 12 and 12' since the feeder device is very heavy and is difficult to move manually.

Thus, in operation frame 1 is positioned parallel to the side of a feed pile with auger 24 extending directly against the face of the feed pile. The animals are then able to gain access to the feed by passing their heads between bars 2. The wheels 8 keep the frame 1 at a convenient distance from the face of the feed pile so that as the animals eat, the feed material tends to drop in the space between the feed pile and the frame, and does not tend to be pulled out into the feed area and trampled. When the feed readily available to the animals at the lower part of the pile decreases sufficiently the cattle supervisor may then start motor unit 30 and operate the auger 24. With the auger being rotated, the auger assembly 18 may then be moved along track 16 in the manner described above, whereby the rotating auger causes portions of the feed to be disengaged from the upper part of the feed stack and dropped within convenient range of the animals. In order to further facilitate removal of the feed by the auger, teeth 28 may be affixed to the auger 24 by any conventional method, for example, welding, rivets or bolts. Whilst the rotating auger is being moved across the track 16, the protective shield 23, which is situated on the side of the auger facing the operator, prevents any danger of injury to the operator.

Once the feed has been disengaged and dropped within convenient feeding range of the animals, the operator may leave the device unattended since the cattle themselves will move the frame closer to the feed pile as they push forward to reach the feed.

Thus, it may be seen that the animal feeder of this invention enables the feed in a bunk silo or the like to be readily made accessible to the feeding animals. The device is also advantageous in that, when used with tall bunk silos, it eliminates the danger of overhanging feed falling on the heads of the animals, and furthermore enables a higher pile of feed to be utilized without any increase in the degree of spoilage (spoilage being the feed which tends to rot at the top of the feed pile).

What I claim as my invention is:

1. An animal feeder comprising in combination:
   a. a frame assembly including a plurality of vertical bars spaced to receive the head and neck portion of a feeding animal between adjacent bars;
   b. a plurality of wheels supporting said frame in an upright position and permitting movement of said frame;
   c. horizontal track means disposed along the top of said frame assembly; and
   d. an auger assembly movable along said track means, said auger assembly having an auger projecting forwardly of said frame and adapted to remove feed from a feed pile situated in front of said frame.

2. An animal feeder comprising in combination:
   a. a frame having a plurality of spaced apart vertical bars adapted to receive the head and neck of a feeding animal between adjacent bars;
   b. a plurality of wheels supporting said frame in an upright position and permitting movement of said frame;
   c. a longitudinal track mounted horizontally along the upper portion of said frame;

d. an auger assembly movable along said track, said auger assembly being adapted to remove feed from a feed pile situated in front of said frame and comprising a substantially vertically disposed auger rotatable about its longitudinal axis and a motor means adapted to both rotate said auger and move said assembly along said track, the arrangement being such that when the frame is positioned against the feed pile movement of the rotating auger across the upper face of the feed pile disengages the feed and causes it to fall between said frame and the feed pile, whereby it is accessible to the feeding animals.

3. An animal feeder according to claim 2 wherein the auger is adjustably mounted so as to be movable towards or away from the frame.

4. An animal feeder comprising in combination:
a. a frame having a plurality of spaced apart vertical bars adapted to receive the head and neck of a feeding animal between adjacent bars;
b. a plurality of wheels supporting said frame in an upright position and permitting movement of said frame;
c. a longitudinal track mounted horizontally along the upper portion of said frame;
d. an auger assembly movable along said track, said auger assembly being adapted to remove feed from a feed pile situated in front of said frame and comprising an auger rotatable about its longitudinal axis and hydraulic motor means adapted to both rotate said auger and move said assembly along said track; and
e. a motor unit mounted on said frame and adapted to power said hydraulic motor means, the arrangement being such that when the frame is positioned against the feed pile movement of the rotating auger across the upper face of the feed pile disengages the feed and causes it to fall between said frame and the feed pile, whereby it is accessible to the feeding animals.

5. An animal feeder according to claim 4 wherein separate hydraulic motor means are provided to move the auger assembly along the track and to rotate said auger.

6. An animal feeder according to claim 5 which further incorporates:
f. drive wheels secured to said frame, said drive wheels incorporating hydraulic motors mounted within the hubs of said drive wheels, said hydraulic motors also being powered by said motor unit, whereby operation of said drive wheels enables an operator to drive said animal feeder up against the feed pile.

7. An animal feeder according to claim 6 wherein said motor unit incorporates a manually operable control means adapted to control the distribution of power from said unit to the auger assembly hydraulic motor means and to the drive wheel hydraulic motors.

8. An animal feeder according to claim 7 wherein the auger is adjustably mounted so as to be movable towards or away from the frame.

* * * * *